June 18, 1968
F. MAGINNIS
3,388,719
INTERNAL TANK VALVES
Filed July 5, 1966
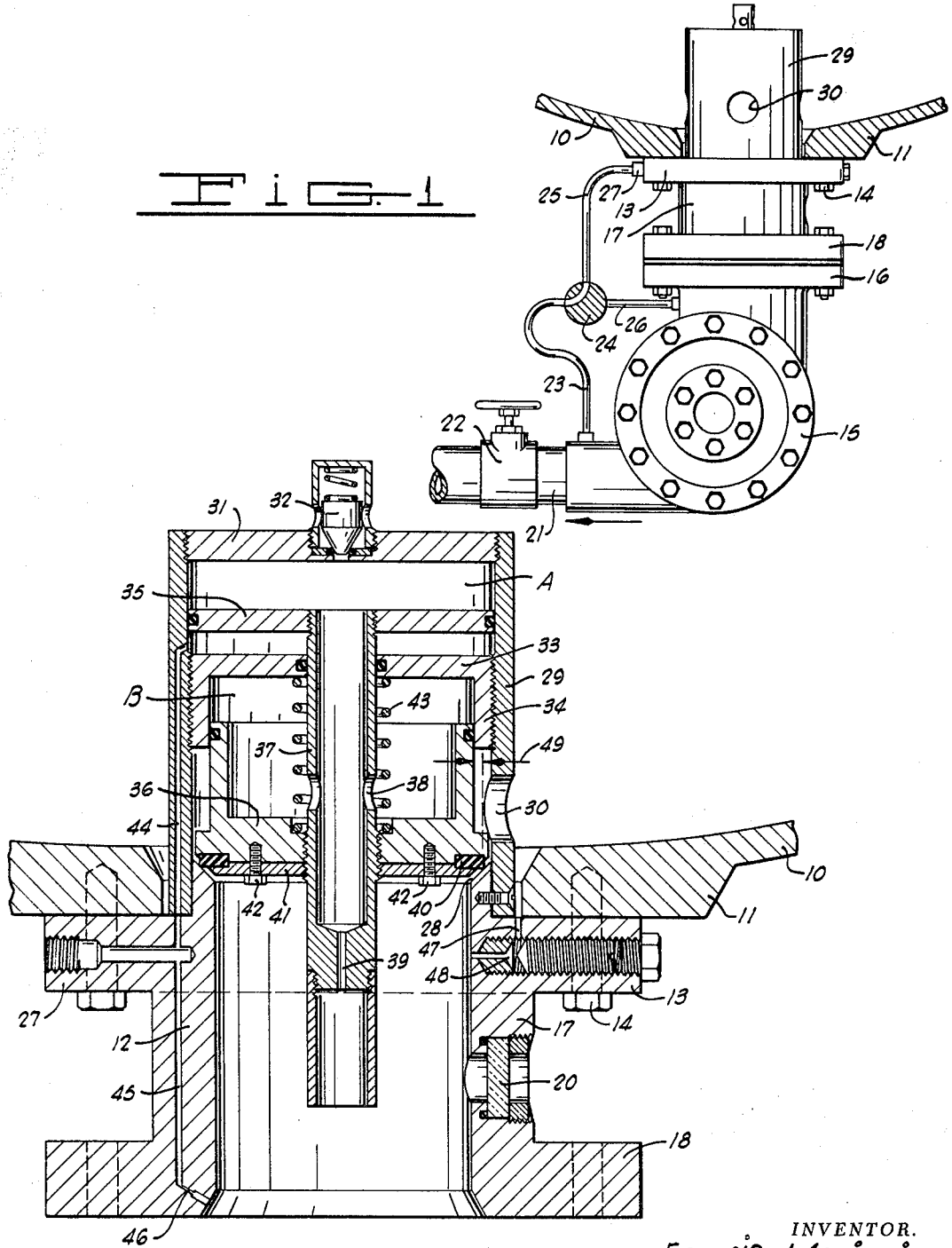
INVENTOR.
FRANCIS MAGINNIS
BY Earl Babcock,
ATTORNEY

United States Patent Office 3,388,719
Patented June 18, 1968

3,388,719
INTERNAL TANK VALVES
Francis Maginnis, P.O. Box 368,
Norman, Okla. 73070
Filed July 5, 1966, Ser. No. 562,562
10 Claims. (Cl. 137—565)

ABSTRACT OF THE DISCLOSURE

This application has to do with valves mounted in tanks which are used to transport fluid in bulk, such as truck tanks. The present invention has the valve so designed that it can not be opened manually. It can be opened only by a fluid pressure system connected to a pump and remains closed unless the pump is operating. If the pump fails, the valve closes.

---

This invention relates to internal tank valves and is particularly adapted for use in tank-trucks or the like.

Fluid in bulk is now commonly transported in tanks on trucks and tank cars on railroads. Some of these fluids, such as liquefied petroleum gases are under pressure in the tanks, and have to be handled with care.

In the U.S. Patent to Penfield, No. 1,524,054, granted Jan. 27, 1925, it is proposed to place a valve in a tank for carrying gasoline. The valve is wholly housed within the tank, so that it cannot be rendered inoperative except through destruction of the wall of the tank. The valve is operated by fluid pressure generating means outside of the tank which is connected by a fluid conduit to pressure responsive means inside the tank and connected to the valve. Thus a fundamental safety feature is provided.

As the art has developed, many improvements have been made, and the art may be said to be fairly well developed. See the U.S. Patent to Shaw, No. 3,199,534 and the prior art cited by the Examiner against the Shaw patent, for example.

Nevertheless, the operation of internal tank valves has not been entirely satisfactory, and the demands for greater safety of operation, particularly with such inflammable fluid as propane and the like, has caused the industry constantly to seek improvements.

It is an object of the present invention to provide an internal tank valve which is operated automatically in response to pressure conditions in a pump located on the tank below the valve, which is simple in design and very reliable in operation, and which overcomes some of the difficulties heretofore encountered in safely controlling the flow of fluids under pressure out of or into a tank.

Another object is to provide a valve arrangement of the class indicated in which a small fluid pressure is all that is required to open the valve.

Other objects and advantages will be apparent to those skilled in the art from the following description, taken in connection with the accompanying drawing, in which:

FIG. 1 is a cross-sectional view of a portion of a tank with a pump mounted beneath it and with a valve constructed in accordance with the present invention mounted internally of the tank and connected to the pump to be opened or closed in response to pressure conditions in the pump or in the conduits associated with the pump, together with a diagrammatic showing of auxiliary equipment; and FIG. 2 is an enlarged vertical cross-sectional view of the valve of FIG. 1 and illustrating a preferred embodiment of its internal construction.

Referring to the drawing in detail, the tank 10 is provided with an opening in its bottom surrounded by a heavy circular flange 11. The main valve body 12 is also provided with a matching flange 13 so that it can be securely fastened to the flange 12 of the tank 10 by bolts 14 spaced around the circumference in the usual manner.

There is a pump 15 mounted on the tank 10 below the valve body 12. Ordinarily, the pump 15 is driven by a power take-off from the engine on the truck upon which the tank 10 is mounted. Since this is conventional, it is not shown. Of course, other means may be used to drive the pump.

The pump 15 has a circular flange 16. If desired, the flange 16 may be bolted directly to the flange 13, but it is preferred to provide the valve body 12 with a depending cylindrical portion 17 and a second flange 18, to which the flange 16 of the pump may be secured.

With the construction illustrated, provision is made for incorporating one or more windows 20 in the structure of the valve body exterior of the tank, so that an operator can determine visually the position of the movable element of the valve to see whether it is open or closed.

The pump 15 is used to pump fluid out of the tank 10. Fluid in the tank is caused to flow, under pressure, in the direction of the arrow, into an outlet conduit 21. This conduit should have a manually operable valve 22 therein, as shown, for use in case of emergency.

In the outlet conduit 21, between the pump 15 and the valve 22, there is connected a fluid pressure conveying conduit 23. This is connected, through a switching valve 24, shown diagrammatically in FIG. 1, to two conduits, 25 and 26. Conduit 25 leads to a coupling 27 on the valve body 12. Conduit 26 leads to the intake side of the pump 15.

The valve 24 and the conduit 26, like the valve 22 in the discharge pipe 21, is an emergency arrangement. Other emergency shut-off valves may, of course, be used with the present invention where necessary to comply with safety codes.

The switching valve 24 is such that fluid pressure on the discharge side of pump 15 can be conveyed to conduit 25, this being the case when the valve 24 is in the position illustrated.

If the rotor of valve 24 is rotated 90 degrees clockwise, the conduit 25 is connected to conduit 26. This relieves the pressure in conduit 25 because it is then connected to the intake side of the pump.

From the above description, it will be seen that when the pump 15 is running and creating fluid pressure, that pressure can be conveyed through the conduit 25 to coupling 27 of the valve body 12. If the pump stops, the pressure will diminish. Or, the operator may relieve the pressure in the conduit 25 by switching the valve 24.

Referring now particularly to FIG. 2 of the drawing, the internal construction of the valve arrangement will be described so that an understanding may be had of what happens in response to variations in fluid pressure in the conduit 25.

The valve arrangement, as that term is used herein, includes not only the main valve itself but also the fluid pressure system for opening or closing the valve. The entire arrangement is wholly housed within the tank 10.

The main valve body 12 is provided with a conventional, circular, tapered seat 28 which is well above the flange 13.

Surrounding the seat 28 is a cylinder 29 which may be referred to as a bonnet. The bonnet may be press-fitted upon the valve body 12 or otherwise secured thereto, or it may be otherwise made so as to be an integral part thereof. As illustrated, it is secured by screws.

The bonnet 29 has openings 30 which permit fluid to enter the valve body 12 from the tank 10 and flow past the seat 28 when the seat is not covered.

There is a lid 31 fastened to the top of the cylinder 29. The lid 31 is provided with a spring closed check valve 32, the purpose of which will be explained hereinafter.

Also, the bonnet 29 is provided with a circular partition 33 which has a depending skirt 34.

It is to be understood that the circular partition 33 with its depending skirt 34 is an integral part of the cylinder 29, and so, an integral part of the main valve body 12.

Thus, the partition 33 divides the bonnet 29 into an upper and a lower chamber. The upper chamber is designated A, and the lower chamber is designated B.

There are two pistons in the bonnet 29, one designated 35, being adapted to fit against the wall of chamber A, and the other, designated 36 against the wall of chamber B. Each of these pistons is provided with an O-ring to maintain a good seal. The walls of chambers A and B are coated so that movement of the pistons therein may be as free of friction as possible. The coating may be sintered Teflon (polytetrafluoroethylene compound) or the like.

The two pistons 35 and 36 are connected together by a hollow stem 37. The stem passes through a central opening in the partition 33 which is provided with an O-ring to prevent leakage of pressure at this point.

The stem 37 preferably extends down some distance below the lower piston 36 so that its lower end can be seen through the window, if present, when the pistons are in their lower position.

Ports 38 are provided in the hollow stem 37 above the piston 36. Thus the pressure in chamber B above piston 36 is always the same as that in the space in chamber A above piston 35.

The hollow stem 37 extends down into the space in the valve body 12 below the seat 28 thereof. It contains a bushing drilled with a small longitudinal hole to provide an orifice 39 through which fluid may pass in either direction between chamber A, above piston 35, and the space in the valve body beneath the seat 28 thereof.

The lower piston 36 is cup shaped, as illustrated. The upwardly extending bearing portion serves to seal against the wall of chamber B, while the bottom of the cup serves to close off the seat 28 of the main valve body 12. To this end, the bottom is provided with a sealing ring 40 held in place by a plate 41 and screws 42.

A compression spring 43 is interposed between the partition 33 and the lower piston 36 so as to urge the sealing ring 40 against the seat 28.

The portion of chamber A beneath the piston 35 is subjected to fluid pressure to lift the piston and thus lift the sealing ring 40 off of its seat 28. For this purpose, the main valve body 12 and the bonnet 29 are provided with an upwardly extending passageway 44 to this portion of chamber A, this passageway leading from the coupling 27 to which the conduit 25 from the pump 15 is attached.

For safety, the valve body 12 is also provided with a downwardly extending passageway 45, which has a restriction 46 therein, the passageway 45 leading to a point beneath the valve seat 28. Thus should the conduit 25 become plugged, or the pressure from the pump fail for some reason, the pressure in chamber A beneath piston 35 will bleed off and the main valve close automatically.

Some pumps need to be primed before they can build up appreciable pressure on their discharge side. If the pump 15 is of this nature, or in some cases, if it is not, means for supplying a modicum of fluid to the pump from the tank 10 may be desirable. For this reason a needle valve by-pass is provided in the main valve body 12.

The opening in the flange 11 of the tank may be slightly larger than the outside diameter of the cylinder 29 so as to leave an annular space between the two, as illustrated. Fuild can pass through this space and into a vertical passageway 47 leading to the conventional needle valve 48.

Before describing the operation of the apparatus described, it should be pointed out that certain relative dimensions are important. In the drawing, the outside diameter of the piston 36 at the point where its O-ring makes a seal with the skirt 34 of the partition 33 is shown as less than the outer diameter of the sealing ring 40. Arrows are placed on the drawing at 49 to emphasize this difference in diameters. The annular area between the circles of these different diameters is hereinafter called the "differential area."

It is within the purview of this invention to design the valve so that these two diameters are the same, or that one is considerably larger than the other, but it is to be noted that the operation of the valve is markedly affected by these relative dimensions.

In the preferred embodiment of the invention, the effective outer diameter of the piston 36 in the skirt 34 is slightly less than that of the outer diameter of the ring 40, and so, it is shown as such in the drawing, although the difference is not quite as great as represented by the draftsman for clarity of illustration. The importance of this difference in dimensions will be apparent from the following discussion of the operation of the apparatus.

Assuming that the parts are in the position illustrated in the drawing, except that the needle valve 48 is closed, and that the tank 10 contains fluid under pressure, such as propane. Assume, also, that the pump 15, when rotated, is ready to deliver pressure to the conduit 21, but the pressure in the pump is atmospheric. The static forces holding the ring 40 upon the seat 28 then are as follows:

(1) The weight of the piston assembly.
(2) The frictional force between the piston and the walls of the chambers A and B.
(3) The force exerted by the spring 43.
(4) The hydrostatic head of the liquid portion of the fluid in the tank 10 exerted upon the differential area, as defined above.
(5) The vapor pressure of the gaseous portion of the fluid in the tank 10 exerted upon the differential area, as defined above.

Force No. 1 is small compared with some of the others and may be neglected.

Force No. 2 can also be reduced to a very small factor if the walls of chambers A and B are coated with sintered Teflon as described above.

Force No. 3 can, of course, be varied greatly in designing the valve. The spring 43 is provided mainly as a safety factor to close the main valve in case the hydraulic system for opening and closing it fails to operate for some reason.

Force No. 4 varies depending upon the nature of the fluid in the tank and upon how full the tank is. Should the truck carrying the tank turn completely over, it would disappear entirely.

Force No. 5 is very important. Ordinarily, it is the main one which has to be overcome by the pump 15 in lifting the ring 40 off of seat 28 to open the main valve. The greater the differential area, i.e., the smaller the diameter of the piston 36 where it seals against the skirt 34 with respect to the sealing circle of the ring 40 (which is here considered as the outer diameter of the ring 40), the greater will be the total force tending to hold the main valve closed under the influence of this vapor pressure.

Now, let it be assumed that the pump 15 is rotated. Fluid under pressure is supplied to the conduit 25 and this pressure is transmitted to the under side of the piston 35 so that it tends to rise and open the main valve.

However, as soon as the pump 15 starts to rotate, there is a drop in pressure on its intake side. This creates a dynamic force, in addition to the static forces listed above, temporarily tending to hold the main valve closed, because the pressure below the piston 36 is now less than it was before.

This dynamic force is soon dissipated as fluid flows from the chamber B and from the portion of chamber A above the piston 35 down through the orifice 39. As this flow takes place, the pistons slowly and smoothly rise and the main valve takes its full open position, so that the vapor pressure in tank 10 becomes approximately the same as that at the intake side of the pump 15.

If, for any reason, the pump 15 fails to maintain pressure beneath the piston 35, the main valve will close under the action of the spring 43, and it cannot again be opened unless fluid pressure is again exerted under piston 35.

Some tanks are provided with independent means for filling them. However, the arrangement of the present invention may be used to fill tank 10 as well as empty it. Ordinarily, the pump 15 is not reversible. It may be disconnected mechanically from its power take-off and serve merely as a conduit in conveying fluid into the tank through the main valve. A separate pump (not shown) may suck fluid from the conduit 21 and deliver it to a point beneath the piston 36. Or, the pump 15 may be taken off entirely and other means supplied for filling the tank 10 through the main valve.

When there is fluid beneath the piston 36 at a greater pressure than that in the tank 10, the main valve will open. This would not be true were it not for the orifice 39 and check valve 32. Because of the pressure drop in the flow of fluid through the orifice 39, the pressure in chamber B and in chamber A above the piston 35 will be less than that exerted by the filling pump but still sufficient to open check valve 32.

The check valve 32 permits relief of the pressure in chamber A during filling. Fluid can flow through it into the tank 10, but cannot flow from the tank 10 through it into the chamber A. Thus, the valve 32 facilitates opening of the main valve during filling of tank 10.

There are several important features about the present invention that distinguish it from other valves currently in use in this particular industry.

Primarily, the simplicity of the piston arrangement, with the assurance that the main valve will open, and do so smoothly, when the pump 15 is operated to deliver fluid from the tank 10, makes it unnecessary to supplement the hydraulic system with an external, manually operated system for use in case the hydraulic system fails.

From a safety standpoint, this is most important, for it is common knowledge that operators sometimes open valves manually, where provision is made for so doing, at a time when the delivery pump is not operating. Operators sometimes even secure the valve in the open position and render it inoperative. There is no way to do so with the present invention.

A second important feature is that the power piston 35 that operates to open the main valve when the delivery pump 15 is started has a very large area and is subjected, in the chamber A, to the total and true differential pressure generated by the pump 15.

Because of the piston arrangement, a very large closure spring 43 can be used and a high degree of safety achieved in that the valve cannot bounce open during transportation.

Another important feature results from the fact that a safe internal tank valve is provided at a fraction of the cost of some currently in use because there are no shafts extending through the valve body, with their expensive seals, and because there are no precision cams and hand operated levers installed.

While only one embodiment of the invention has been shown and described, it is obvious that various changes may be made in the arrangement and construction of parts without departing from the spirit of the invention or the scope of the annexed claims.

I claim:

1. In combination, a tank having a fluid outlet in the bottom thereof, a delivery pump mounted beneath the outlet, and a valve arrangement housed within said tank at said outlet and adapted to control the flow of fluid from the tank to the pump, said valve arrangement including valve body means having a conventional seat and sealing means adapted to fit against said seat to close the valve, together with a fluid pressure system for raising or lowering said sealing means to open or close the valve in response to fluid pressure generated by operation of said pump, said valve body means including an integral bonnet, and said system including a partition in said bonnet dividing the space therein into an upper and a lower chamber, port means providing communication between the tank and said lower chamber, two pistons, one in each chamber, means for supplying fluid under pressure from the discharge side of said pump to the space in the upper chamber beneath the piston therein, and a stem extending in sealed relation through said partition and integrally connecting the two pistons together and integrally connecting both pistons to said sealing means, said stem being hollow and provided with ports so as to permit the flow of fluid between the space in the upper chamber above the piston therein and the space in the lower chamber above the piston therein and to connect both of these spaces to the space in the valve body means beneath the valve seat thereof.

2. The combination defined in claim 1 in which said hollow stem is provided with an orifice means restricting the rate of flow of fluid therethrough to or from the space beneath the valve seat.

3. The combination defined in claim 1 in which the diameter of the lower piston is less than the diameter of said sealing means at the points where the sealing is effected.

4. The combination defined in claim 1 in which the walls of said chambers are coated with sintered Teflon to reduce the friction of said pistons as they move therein.

5. In apparatus for transporting fluids of the class described wherein a tank is provided with an opening in the bottom thereof, the combination with said tank of a valve arrangement adapted to be housed within the tank, said valve arrangement including valve body means having a conventional seat and sealing means adapted to fit against said seat to close the valve, together with a fluid pressure system for raising or lowering said sealing means, said valve body means including an integral bonnet, and said system including a partition in said bonnet dividing the space therein into an upper and a lower chamber, port means providing communication between the tank and said lower chamber, two pistons, one in each chamber, means for supplying fluid under pressure to the space in the upper chamber beneath the piston therein, a stem extending in sealed relation through said partition and integrally connecting the two pistons together and integrally connecting both pistons to said sealing means, and fluid conduit means connecting the space in the upper chamber above the piston therein to the space in the lower chamber above the piston therein and connecting both of said spaces to the space in the valve body means beneath the valve seat thereof.

6. The arrangement of claim 5 in which the diameter of the lower piston is less than the diameter of said sealing means at the points where the sealing is effected.

7. The arrangement of claim 5 in which the walls of said chambers are coated with sintered Teflon to reduce the friction of said pistons as they move therein.

8. The arrangement of claim 5 in which said fluid conduit means consists of a fluid passage through said stem provided with ports into the space in the lower chamber above the piston therein.

9. The arrangement of claim 5 in which said fluid conduit means is provided with orifice means restricting the rate of flow therethrough to and from the space beneath the valve seat.

10. The arrangement of claim 5 in which check valve means are provided in said bonnet for establishing communication between the upper chamber and the interior of said tank, the check valve means being operated to permit fluid flow from the upper chamber into the tank but prevent fluid flowing from the tank into said upper chamber.

References Cited

UNITED STATES PATENTS

| | | | |
|---|---|---|---|
| 2,727,530 | 12/1955 | Glove et al. | 251—63.5 |
| 2,931,616 | 4/1960 | White et al. | 251—52 |
| 3,164,358 | 1/1965 | Mac Spollan | 251—144 |
| 3,175,579 | 3/1965 | Shaw | 137—565 |
| 3,199,534 | 8/1965 | Shaw et al. | 251—144 |

FOREIGN PATENTS 940,679  10/1963  Great Britain.

M. CARY NELSON, *Primary Examiner.*

W. R. CLINE, *Assistant Examiner.*